United States Patent [19]

Satzler et al.

[11] Patent Number: 4,519,654
[45] Date of Patent: May 28, 1985

[54] ROLLER SUSPENSION APPARATUS FOR A BELTED VEHICLE

[75] Inventors: Ronald L. Satzler, Princeville; Samuel B. Stevens, Pekin, both of Ill.

[73] Assignee: Caterpillar Tractor Co., Peoria, Ill.

[21] Appl. No.: 563,335

[22] Filed: Dec. 20, 1983

[51] Int. Cl.³ .............................................. B62D 55/16
[52] U.S. Cl. ...................................... 305/27; 305/28; 180/9.54
[58] Field of Search ....................... 305/16, 17, 24, 25, 305/27, 28, 31; 280/683, 685, 687; 180/9.54, 9.6

[56] References Cited

U.S. PATENT DOCUMENTS

| | | | |
|---|---|---|---|
| 1,386,978 | 8/1921 | Wickersham | 305/25 X |
| 1,514,188 | 11/1924 | Wickersham | 305/25 X |
| 3,323,811 | 6/1967 | Nelson | 280/104.5 |
| 4,202,564 | 5/1980 | Strader | 280/678 |
| 4,351,572 | 9/1982 | Fujiwara et al. | 305/27 |

Primary Examiner—David A. Scherbel
Attorney, Agent, or Firm—John W. Grant

[57] ABSTRACT

Roller suspension apparatus are useful for example in belted vehicles. The heretofore known roller suspension apparatus impart a shear force to the spring due to the geometry and the relationship between the roller mounting arms, the walking beam, and the pivot pins to which the arms and beam are pivoted. The subject roller suspension apparatus has a pair of arms and a force transmitting beam pivotally connected to a single pivot shaft. The mounting surfaces to which a pair of springs are attached are then arranged relative to the pivot shaft such that substantially only compressive forces are imparted to the springs. Thus, the full shock absorbing potential of the springs is fully utilized.

11 Claims, 5 Drawing Figures

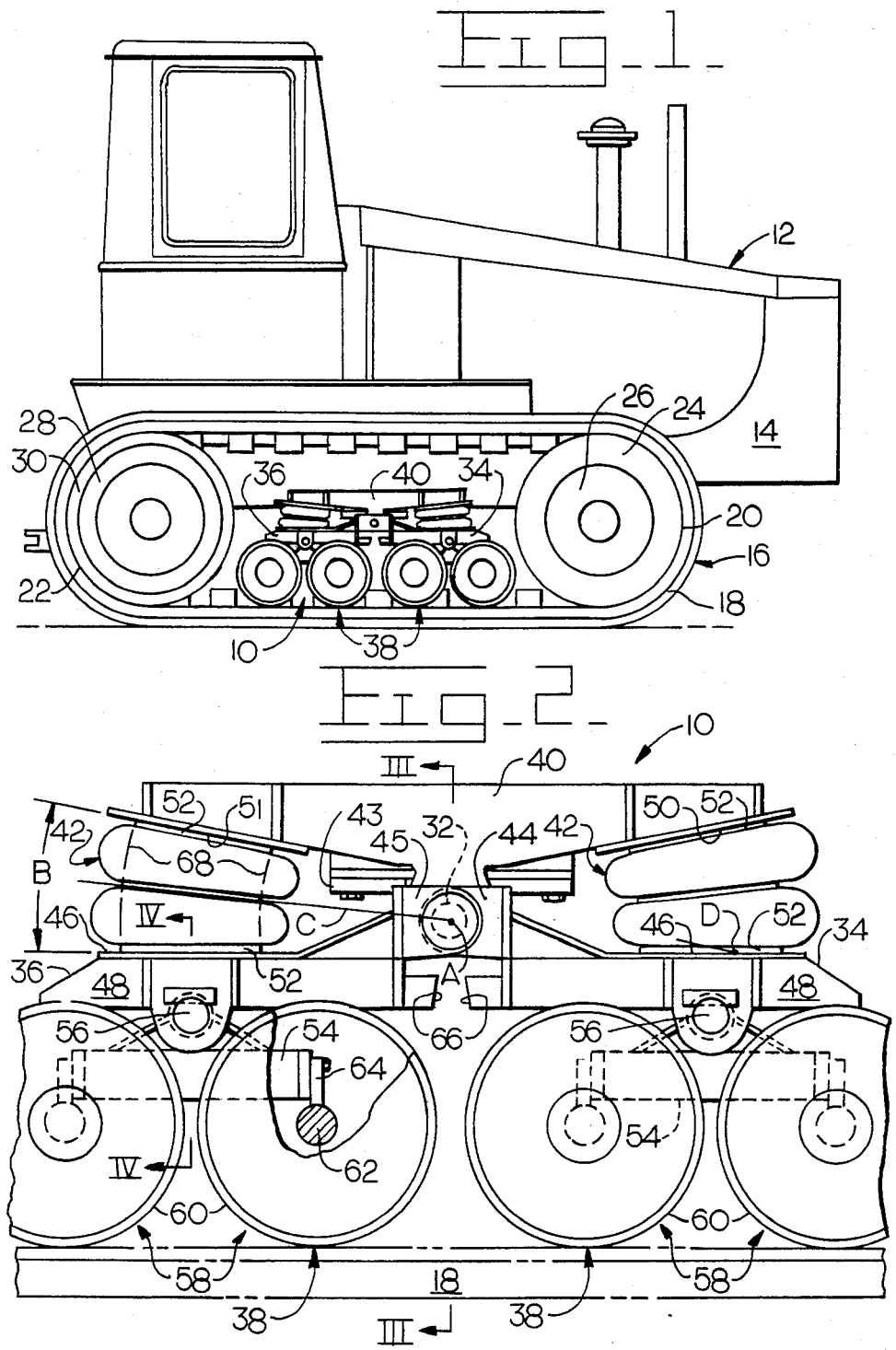

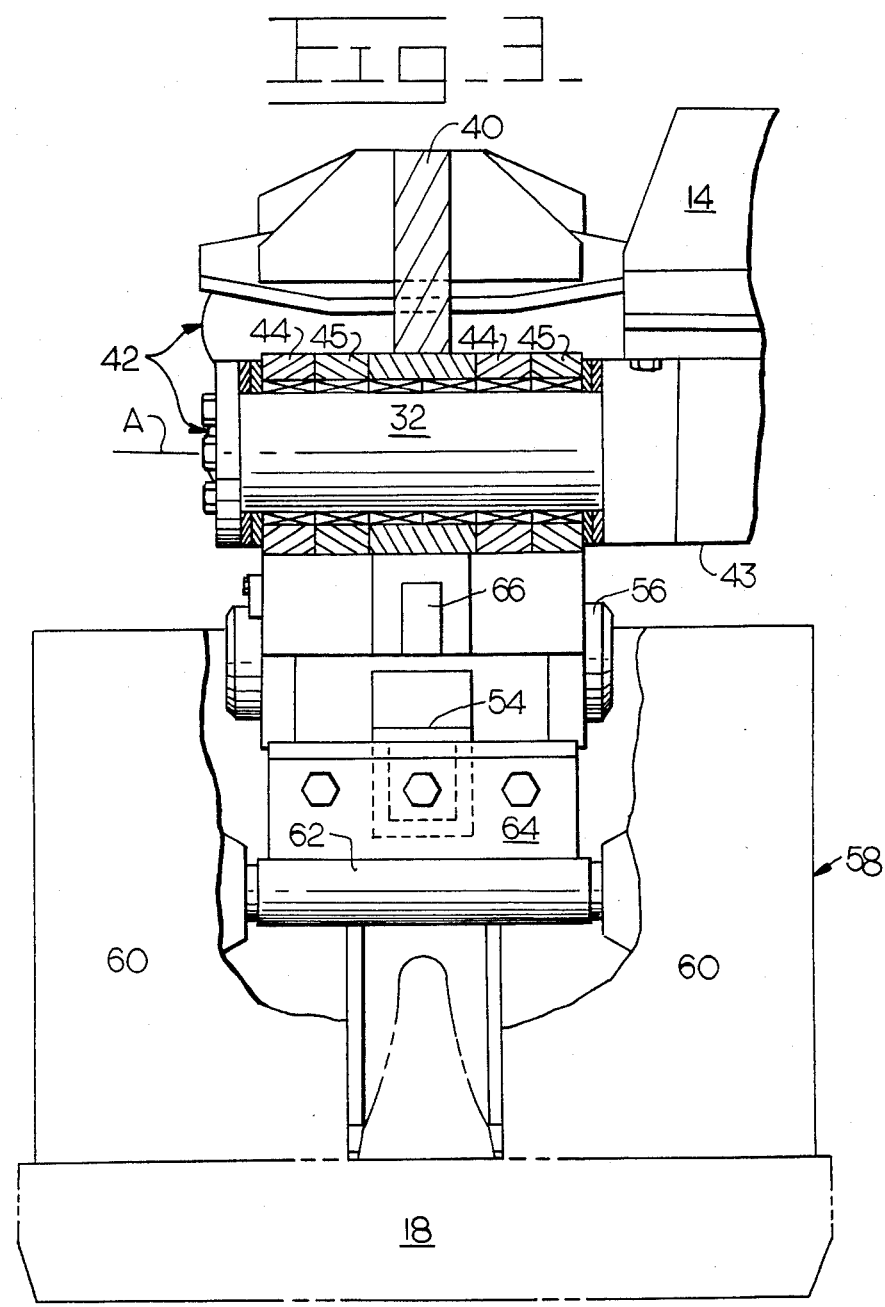

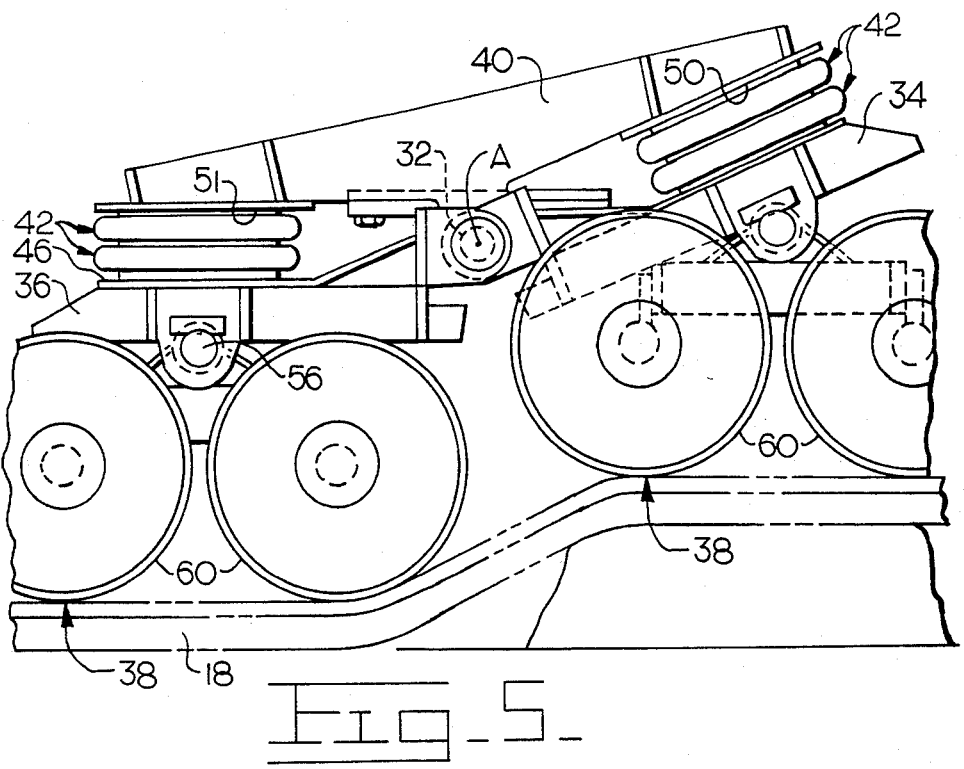
Fig_5_
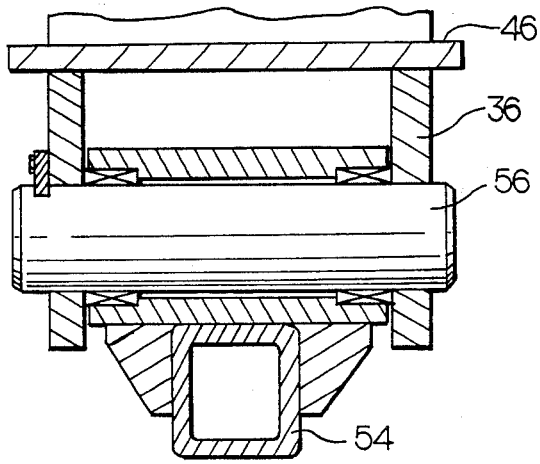
Fig_4_

ROLLER SUSPENSION APPARATUS FOR A BELTED VEHICLE

DESCRIPTION

1. Technical Field

This invention relates generally to a roller suspension apparatus and more particularly to such an apparatus in which substantially only compressive forces are imposed upon a spring.

2. Background Art

Many track roller and tandem wheel support systems use a resilient elastomer pad between the ends of a pair of pivotal arms for absorbing shock loads. The elastomer pads are normally connected to one or both of the arms. One such suspension system is shown in U.S. Pat. No. 3,323,811 which issued to J. M. Nelson on Jan. 12, 1965. That patent shows a pair of radius arms each having an end pivotally connected to a bracket by separate pins while a walking beam is pivotally secured at its mid-point to the bracket by another pin. A wheel is rotatably carried at the distal end of the radius arms. Resilient pad springs are positioned between the distal ends of the radius arms and the end of the walking beam. Thus, an upward force on one wheel is transmitted to the springs so that a downward force is imparted to the other wheel.

One of the problems associated with that suspension system is that three separate pins are used to pivotally connect the radius arms and walking beam to the supporting bracket thereby adding to the cost of the structure. Another problem is that a particular geometry thereof induces a component of shear in the springs when a compressive force is imposed thereon due to a load being applied to one of the wheels. Such shear induced into the springs is deleterious to the suspension system and/or the operation thereof.

The present invention is directed to overcoming one or more of the problems as set forth above.

DISCLOSURE OF THE INVENTION

In one aspect of the present invention a roller suspension apparatus for use on a belted vehicle having a frame includes a single pivot shaft adapted to be connected to the vehicle frame. A pair of arms are each pivotally connected at one end to the pivot shaft and extend in opposite directions from the pivot shaft. Each of the arms has a mounting surface at a distal end portion thereof. A pair of roller mechanisms are individually connected to the distal end portions of the arms. A force transfer beam is pivotally connected at its mid-portion to the pivot shaft and has first and second mounting surfaces individually generally facing a respective one of the mounting surfaces of the arms defining two pairs of facing mounting surfaces. A spring means is positioned between each pair of facing mounting surfaces in load bearing and force transferring relation. The mounting surfaces are arranged relatively to the pivot shaft so that substantially only compressive forces are transmitted to the spring means upon movement of the mounting surfaces of each pair of facing mounting surfaces toward one another.

The problems of shear forces being transmitted to the springs positioned between the pivotal arms of roller or tandem wheel suspension systems is solved by the present invention by pivotally connecting the arms and the force transfer beam to a single pivot shaft and positioning the mounting surfaces, to which the springs are connected, relative to the pivot shaft such that the mounting surfaces move in the same arcuate path when one of the mounting surfaces moves toward the other mounting surface. By so doing, substantially only compressive forces are transmitted to the springs during such movement of the mounting surfaces.

BRIEF DESCRIPTION OF THE DRAWINGS

FIG. 1 is a side elevational view of a vehicle including an embodiment of the present invention.

FIG. 2 is an enlarged side elevational view of a portion of FIG. 1.

FIG. 3 is a cross-sectional view taken along line III—III of FIG. 2.

FIG. 4 is a cross-sectional view taken along line IV—IV of FIG. 2.

FIG. 5 is a view similar to FIG. 2 with components thereof in a loaded condition.

BEST MODE FOR CARRYING OUT THE INVENTION

Referring now to the drawings, a roller suspension apparatus is generally indicated by the reference numeral 10 in association with a work vehicle 12. The work vehicle has a longitudinally extending main frame 14 and a propulsion system 16 residing generally beneath and in supporting relation to the frame 14. The propulsion sysem 16 includes an endless, inextensible track or belt 18 encircling longitudinally spaced front and rear wheels disposed on one side of the vehicle. In the present embodiment, the front wheel 20 is a non-driving wheel and includes an elastomeric inflatable carcass 24 mounted on a rim 26. The rear wheel 22 is the driving wheel and consists of a drum 28 having a layer of elastomer 30 bonded thereto.

The roller suspension apparatus 10 is disposed intermediate the front and rear wheels 20, 22 for distributively transmitting a portion of the vehicle/load imposed on the vehicle main frame to the belt 18. The roller suspension apparatus includes a single pivot shaft 32, a pair of arms 34, 36, a pair of roller mechanisms 38, a force transfer beam 40, and a pair of spring means 42.

As more clearly shown in FIGS. 2 and 3, the pivot shaft 32 is rigidly connected to the main frame 14 by a mounting bracket 43 and defines a pivot axis A. Each of the arms 34, 36 has a bifurcated end 44, 45 respectively pivotally connected to the pivot shaft 32 and extend in opposite directions therefrom. Each of the arms has a planar mounting surface 46 provided thereon at a distal or outer end portion 48 thereof.

The force transfer beam 40 is pivotally connected at its mid-portion to the pivot shaft 32 and generally overlies the arms 34, 36. The beam has first and second planar mounting surfaces 50, 51 individually generally facing a respective one of the mounting surfaces 46 of the arms 34, 36. The first mounting surface 50 and the mounting surface 46 on the arm 34 define a first pair of facing mounting surfaces while the second mounting surface 51 and the mounting surface 46 on the arm 36 define a second pair of facing mounting surfaces.

The spring means 42 are positioned between and connected to the mounting surfaces 46, 50, and 51 for biasingly transmitting forces exerted on the force transfer beam 40 by one arm 34 or 36 to the other arm 34 or 36. The spring means 42 can include either a single elastomer pd, a plurality of elastomer pads or an inflatable air bags positioned between the facing mounting surfaces. Each of the spring means includes a portion 52 suitably secured to the respective mounting surfaces 46, 50, and 51.

Each of the roller mechanisms 38 includes a walking beam 54 pivotally connected to the distal end portion 48 of the arms 34 and 36 by a pivot pin 56. A pair of roller assemblies 58 are connected to the ends of the walking beam 54. As more clearly shown on FIG. 3, each of the roller assemblies 58 includes a pair of laterally spaced rollers 60 rotatably connected to an axle 62 which is rigidly connected to a bracket 64 connected to the end of the walking beam 54. The rollers 60 rolllingly engage the interior belt surface of the lower belt run.

Alternatively, each of the roller mechanisms 38 could be replaced with a single roller assembly 58 wherein the bracket 64 would be connected direcly to the distal end portion 48 of the respective arms 34, 36.

Each of the arms 34, 36 has a stop surface 66 positioned for engagement with one another to limit movement of the arms 34, 36 in a direction causing the mounting surfaces 46 to move away from the mounting surfaces 50, 51.

The mounting surfaces of each pair of facing mounting surfaces 46,50/46,51 define an acute angle "B" therebetween. A plane illustrated by the line "C" bisecting the angle "B" passes through the axis "A" of the pivot shaft 32. This causes the mounting portions 52 to move in the same arcuate pathway generated about the axis "A" as illustrated by the broken lines 68 on FIG. 2. A convergent point "D" of the angle "B" is preferably disposed at the side of the axis "A" opposite to the side at which the mounting surfaces defining the angle "B" are disposed. This permits the angle "B" to be relatively small and thereby minimizes unequal loading on the spring means 42 caused by the mounting surfaces being angled relative to one another.

INDUSTRIAL APPLICABILITY

In use, the roller suspension system 10 distributes the weight/load equally through the rollers 60 to the belt 18. The arms 34, 36 transmit equal forces to the belt 18 for all conditions whether the forces originate from the vehicle weights, loads exerted on the vehicle, or a combination thereof. In forward operation of the vehicle, for example, when the belt 18 under the rollers 60 of the leading roller assembly 58 initially engages an object protruding from the surface, the leading roller assembly is raised. This causes the leading walking beam 54 to pivot about the pivot pin 56 and applies a downward force onto the rollers 60 of the second trailing roller assembly. Consequently, there is a longitudinal load sharing between the rollers 60 of the two leading assemblies 58 supported on the common walking beam 54.

The raising of the leading roller 60 and eventually the second roller 60 also causes the arms 34 to pivot about the pivot shaft 32 and thereby transmit a compressive force to the spring means 42 between the mounting surface 46 and the mounting surface 50 of the force transfer beam 40 so as to cause pivoting of the force transfer beam in a counterclockwise direction about the pivot shaft 32. Such pivoting of the force transfer beam 40 transfers the increased force and motion through the trailing spring means 42, the arm 36, and the rollers 60 of the trailing roller mechanism 38 to the portion of the belt 18 beneath the trailing rollers 60. As such, longitudinal load sharing between arms 34 and 36 is provided to augment the longitudinal load sharing between the rollers 60 mounted to the leading walking beam 54.

Of course as the trailing rollers 60 pass over the protruding object, the force transfer beam 40 pivots clockwise to transmit motion and forces in the opposite direction to that previously described.

The mounting surfaces 46, 50 and 51 are preferably arranged relative to the pivot shaft 32 so that substantially only compressive forces are transmitted to the spring means 42 upon relative movement of the mounting surfaces of each pair of facing mounting surfaces 46,50/46,51 toward one another. As illustrated in FIG. 2, clockwise pivotal movement of the arm 36 about the shaft 32 causes the mounting portion 52 of the spring means 42 connected to the mounting surface 46 of the arm 36 to move in an arcuate path indicated by the broken lines 68. Since the mounting portion 52 connected to the mounting surface 51 is positioned in the projecting arcuate path of movement of the mounting portion 52 connected to the arm, only compressive forces are transmitted to the spring means 32. Moreover as more clearly illustrated in FIG. 5 at the maximum loaded condition of the spring means 42, the facing mounting surfaces 46,50/46,51 are substantially parallel to one another. As such, the spring means 42 are uniformly stressed so that maximum utilization of the spring force is achieved.

In view of the foregoing, it is readily apparent that the structure of the present invention provides an improved roller suspension system in which substantially only compressive forces are imparted to the spring means during operation. This is accomplished by positioning the mounting surfaces, to which the springs are attached, relative to the pivot shaft so that the connections between the spring and the mounting surface fall in a coincidental arcuate pathway.

Other aspects, objects and advantages of this invention can be obtained from a study of the drawings, the disclosure and the appended claims.

We claim:

1. A roller suspension apparatus adapted for use on a belted vehicle having a frame comprising:

a single pivot shaft adapted to be connected to the vehicle frame;

a pair of arms each pivotally connected at one end to the pivot shaft and extending in opposite directions from the pivot shaft, each of said arms having a mounting surface at a distal end portion thereof;

a pair of roller mechanisms individually connected to the distal end portions of said arms;

a force transfer beam pivotally connected at its midportion to the pivot shaft and having first and second mounting surfaces individually generally facing a respective one of the mounting surfaces of said arms defining two pairs of facing mounting surfaces; and spring means positioned between each pair of facing mounting surfaces in load bearing and force transferring relation; and wherein said mounting surfaces are arranged relative to the pivot shaft so that substantially only compressive forces are tranmitted to the spring means upon movement of the mounting surfaces of each pair of facing mounting surfaces toward one another.

2. The roller suspension apparatus as set forth in claim 1 wherein the mounting surfaces of each pair of facing mounting surfaces define an acute angle therebetween, said pivot shaft defines a axis, and a plane bisecting the angle passes substantially through the axis.

3. The roller suspension apparatus as set forth in claim 2 wherein the mounting surfaces of each pair of facing mounting surfaces are substantially parallel when the spring means are in their fully compressed condition.

4. The roller apparatus as set forth in claim 2 wherein each of said roller mechanisms includes a walking beam pivotally connected to the distal end portion of one of the arms, and a pair of roller assemblies individually connected to the ends of the walking beam.

5. The roller suspension apparatus as set forth in claim 2 wherein each of said arms has a stop surface positioned for engagement with one another and adapted to limit movement of the arms in a direction causing movement of the mounting surfaces of each pair of facing mounting surfaces away from one another.

6. The roller suspension apparatus as set forth in claim 2 wherein said spring means includes a elastomer pad positioned between each pair of facing mounting surfaces and connected to one of the mounting surfaces.

7. The roller suspension apparatus as set forth in claim 2 wherein said spring means includes an air bag positioned between each pair of facing mounting surfaces and connected to one of the facing mounting surfaces.

8. A roller suspension apparatus adapted for use on a belted vehicle having a frame comprising:

a pair of arms disposed in end to end relationship with each of said arms having a mounting surface at an outer end portion thereof;

a pair of roller mechanisms individually connected to the outer end portions of said arms;

a force transfer beam generally overlying the arms and having first and second mounting surfaces individually generally facing a respective one of the mounting surfaces of said arms and defining two pairs of facing mounting surfaces;

spring means positioned between each pair of facing mounting surfaces in load bearing and force transferring relation; and a single pivot shaft having the inner ends of said arms and the midportion of the force transfer beam commonly pivotally connected thereto, said pivot shaft adapted to be connected to the vehicle frame.

9. The roller suspension apparatus as set forth in claim 8 wherein the mounting surfaces of each pair of facing mounting surfaces define an acute angle therebetween, said pivot shaft defines an axis, and a plane bisecting the angle passes substantially through the axis.

10. The roller suspension apparatus as set forth in claim 8 wherein the mounting surfaces of each pair of facing mounting surfaces are substantially parallel when the spring means are in there fully compressed condition.

11. The roller suspension apparatus as set forth in claim 8 wherein the mounting surfaces are arranged relative to the pivot shaft so that the mounting surfaces of each pair of facing mounting surfaces move in substantially the same arcuate pathway.

* * * * *